United States Patent
Cuddihy et al.

(10) Patent No.: US 11,815,614 B2
(45) Date of Patent: Nov. 14, 2023

(54) METHOD AND APPARATUS FOR VEHICLE OCCUPANT LOCATION DETECTION

(71) Applicant: FORD GLOBAL TECHNOLOGIES, LLC, Dearborn, MI (US)

(72) Inventors: Mark A. Cuddihy, New Boston, MI (US); Eric L. Reed, Livonia, MI (US); Manoharprasad K Rao, Novi, MI (US); Thomas Lee Miller, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/851,154

(22) Filed: Jun. 28, 2022

(65) Prior Publication Data

US 2022/0326339 A1      Oct. 13, 2022

Related U.S. Application Data

(62) Division of application No. 15/253,216, filed on Aug. 31, 2016, now Pat. No. 11,391,810.

(51) Int. Cl.
*G01S 5/02* (2010.01)
*G01S 5/14* (2006.01)

(52) U.S. Cl.
CPC ........ *G01S 5/02525* (2020.05); *G01S 5/0226* (2013.01); *G01S 5/0252* (2013.01); *G01S 5/0257* (2013.01); *G01S 5/0284* (2013.01); *G01S 5/14* (2013.01)

(58) Field of Classification Search
CPC .. G01S 5/02525; G01S 5/0226; G01S 5/0252; G01S 5/0257; G01S 5/0284; G01S 5/14
See application file for complete search history.

(56) References Cited

U.S. PATENT DOCUMENTS

| | | |
|---|---|---|
| 8,284,042 B2 | 10/2012 | Rao et al. |
| 9,008,917 B2 | 4/2015 | Gautama et al. |
| 9,061,567 B2 | 6/2015 | Kwon et al. |
| 9,338,605 B2 | 5/2016 | Guba et al. |
| 9,348,492 B1 | 5/2016 | Penilla et al. |
| 9,533,576 B2 | 1/2017 | Kalbus |
| 9,633,402 B1 | 4/2017 | Mccartney |
| 9,672,568 B1 * | 6/2017 | Slusar .................. G08G 1/0112 |
| 9,827,825 B2 | 11/2017 | Kwark |
| 9,888,357 B2 | 2/2018 | Menouar |
| 2004/0045758 A1 | 3/2004 | Breed et al. |
| 2008/0255889 A1 | 10/2008 | Geisler et al. |
| 2012/0010913 A1 | 1/2012 | Lele et al. |
| 2012/0244877 A1 | 9/2012 | Margalef et al. |
| 2014/0031010 A1 | 1/2014 | Wuergler et al. |
| 2014/0274020 A1 | 9/2014 | Miller |

(Continued)

*Primary Examiner* — Cassi J Galt
(74) *Attorney, Agent, or Firm* — Joseph Zane; Brooks Kushman P.C.

(57) ABSTRACT

A system includes a plurality of wireless transmitters and a processor configured to: receive, from a mobile device, signal strengths of signals from the wireless transmitters as detected by the mobile device. The processor is also configured to determine a location of the mobile device in a vehicle, based on a distance from the mobile device to each of the wireless transmitters, as indicated by the received signal strengths and store the location of the mobile device as an occupant location.

7 Claims, 6 Drawing Sheets

(56) References Cited

U.S. PATENT DOCUMENTS

| | | |
|---|---|---|
| 2014/0297220 A1 | 10/2014 | Raffa et al. |
| 2014/0338882 A1 | 11/2014 | Rollinson et al. |
| 2015/0073651 A1 | 3/2015 | Bennie et al. |
| 2015/0148989 A1 | 5/2015 | Cooper et al. |
| 2015/0370253 A1 | 12/2015 | Gurin |
| 2016/0248905 A1 | 8/2016 | Miller et al. |
| 2017/0276764 A1 | 9/2017 | Mlermo et al. |
| 2017/0285642 A1 | 10/2017 | Rander |
| 2017/0313426 A1* | 11/2017 | Morin .................... H04W 4/30 |
| 2017/0316696 A1 | 11/2017 | Bartel |
| 2018/0053416 A1 | 2/2018 | Sanji et al. |

\* cited by examiner

METHOD AND APPARATUS FOR VEHICLE OCCUPANT LOCATION DETECTION

CROSS-REFERENCE TO RELATED APPLICATIONS

This application is a division of U.S. application Ser. No. 15/253,216 filed Aug. 31, 2016, now U.S. Pat. No. 11,391,810, issued Jul. 19, 2022, the disclosure of which is hereby incorporated in its entirety by reference herein.

TECHNICAL FIELD

The illustrative embodiments generally relate to a method and apparatus for vehicle occupant location detection.

BACKGROUND

Automotive original equipment manufacturers (OEMs) are very interested in the capability to determine the locations of occupants within a vehicle cabin. Using such information, advanced vehicle systems (such as airbags) can activate/deactivate. Also, a vehicle can provide control functionality over certain vehicle features to rear seat occupants if the vehicle can detect those occupants. The vehicle can monitor seat belts and give an indication to the driver when a seating location is occupied and the seat belt at that location is not fastened. In addition, the vehicle can adjust climate control output for the number and location of passengers, as well as audio/entertainment system settings. In autonomous vehicles, the vehicle can change the seating configurations during driving specifically to accommodate the seats for which the vehicle determines occupancy.

Sensors can be incorporated into the seats to detect occupant presence by measuring the force on the seat from the occupant's weight. While fully capable of their intended function, from an automotive design standpoint these systems pose some potential difficulties. The force on the seat bottom for a given occupant varies considerably depending on the seating position of the occupant, which may make it necessary to incorporate software algorithms to detect the presence of an occupant (as opposed to simply detecting a force threshold). Cargo placed on the seat can also cause false positive occupancy identifications.

These systems often also operate at reduced capabilities in an environment including a typical rear seat bench, in which the different seating locations are not isolated structurally but all utilize a single seat structure (or sometimes no seat frame at all). This makes it especially difficult to sense the center position in a three-way bench, which may be smaller than the outboard positions and closely connected to the outboard positions by the seat cushion. OEMs may also need to duplicate the force sensors for each seat location, increasing the cost of the system with every additional seating position added to the vehicle.

An alternative solution utilizes video systems to sense occupants and their seating positions. These systems may only require a single camera, regardless of the number of seating positions, but the processing required to achieve occupant detection may include complex video processing. This processing may be prone to errors and may require an expensive, high powered microprocessor to operate. All of these systems have been contemplated and some have even been utilized. The drawbacks of a particular implementation have simply been accepted as necessary even if error prone, as some detection may be more useful than no detection at all.

SUMMARY

In a first illustrative embodiment, a system includes a plurality of wireless transmitters and a processor configured to: receive, from a mobile device, signal strengths of signals from the wireless transmitters as detected by the mobile device. The processor is also configured to determine a location of the mobile device in a vehicle, based on a distance from the mobile device to each of the wireless transmitters, as indicated by the received signal strengths and store the location of the mobile device as an occupant location.

In a second illustrative embodiment, a system includes a mobile device processor configured to detect signals from a plurality of vehicle-deployed antennas. The processor is also configured to determine respective signal strengths for each detected signal. The processor is further configured to determine a distance from each antenna, based on the signal strength of the signal received from each respective antenna. The processor is additionally configured to determine a device location within a vehicle cabin, based on the distance from each antenna and transmit the device location to a vehicle computing system.

In a third illustrative embodiment, a system includes a processor configured to receive signals from a plurality of vehicle deployed antennas, including antenna identification such that each signal identifies an originating antenna. The processor is also configured to determine a signal strength of each received signal. The processor is further configured to determine a device location relative to each antenna, based on the determined signal strength of the signal received from each respective antenna and store the device location as a user location relative to each antenna.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
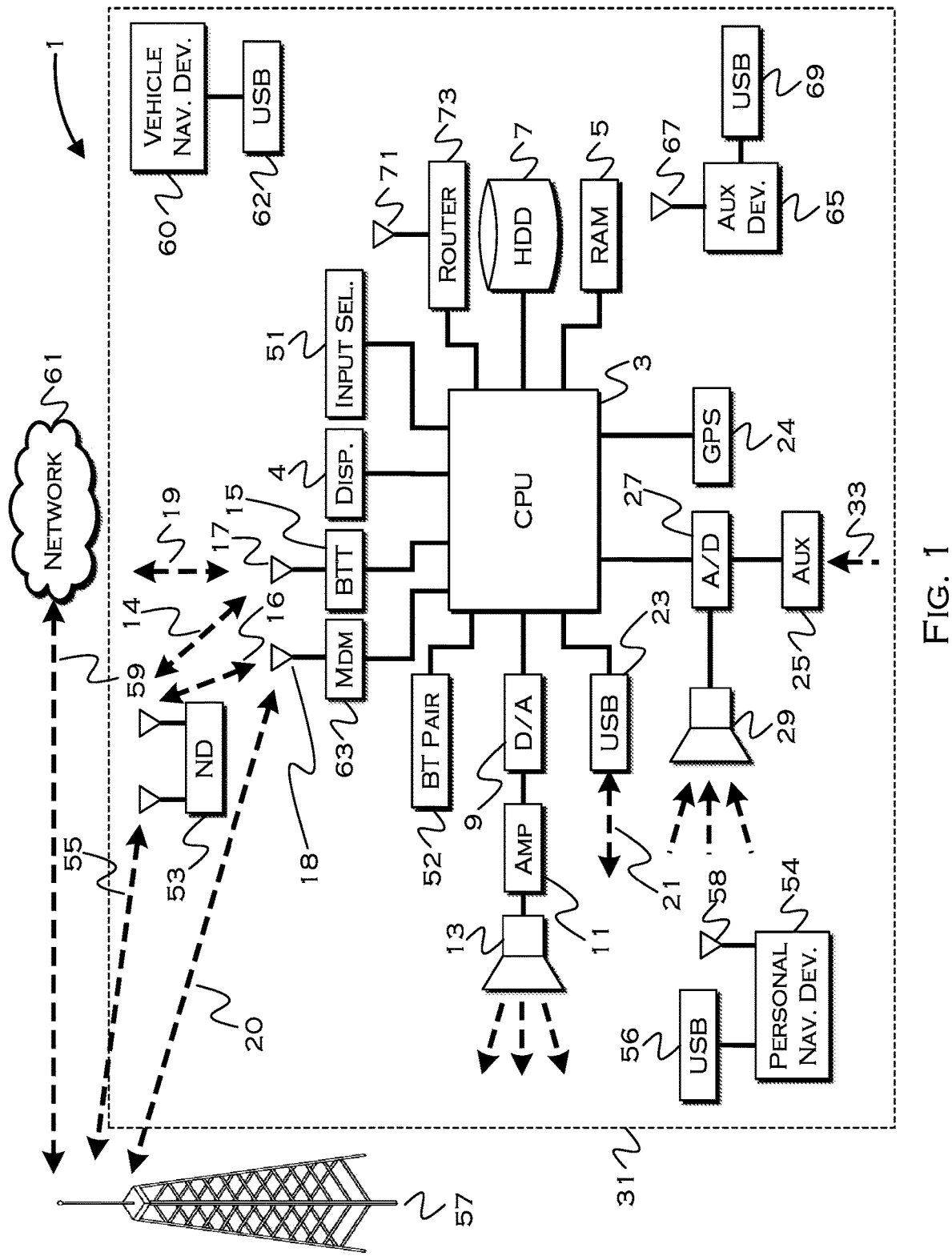
FIG. 1 illustrates a representative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments utilize signal strength determination based on communication between fixed transmitters (or transceivers) in the vehicle and occupant wireless devices. The vehicle or the devices can determine the relative location of each device to fixedly deployed transmitters. The devices can report either their respective locations or received signal strengths, the latter being useful if the vehicle determines the device locations. These relative locations will in turn provide the vehicle with knowledge of what devices are located at each seating position, which may be especially useful with respect to occupant rear seat locations that have presented historic difficulty in detection. Although the illustrative embodiments can be used to determine any seating location, examples are provided with respect to rear seating for illustrative purposes.

Also, the illustrative embodiments present examples of determining device location based on signals received at the devices. An alternative to this could include multiple receiving antennas in the vehicle to simultaneously detect signals from the wireless devices. Similar methodologies could be employed to determine the relative location of the devices based on signal strength received at respective receiving antennas.

Wireless signals used in the illustrative embodiments can include any digital communication protocol, such as, but not limited to, Bluetooth, 802.11x, etc. Software in the vehicle determines the relative strength of the signals to triangulate a location in the vehicle. The signals provide the capability to locate wearables and cellular phones (and other wireless devices) with sufficient precision to determine seating location, without the addition of any physical sensors and without requiring pairing or special setup on the part of the owner.

Figure 2:
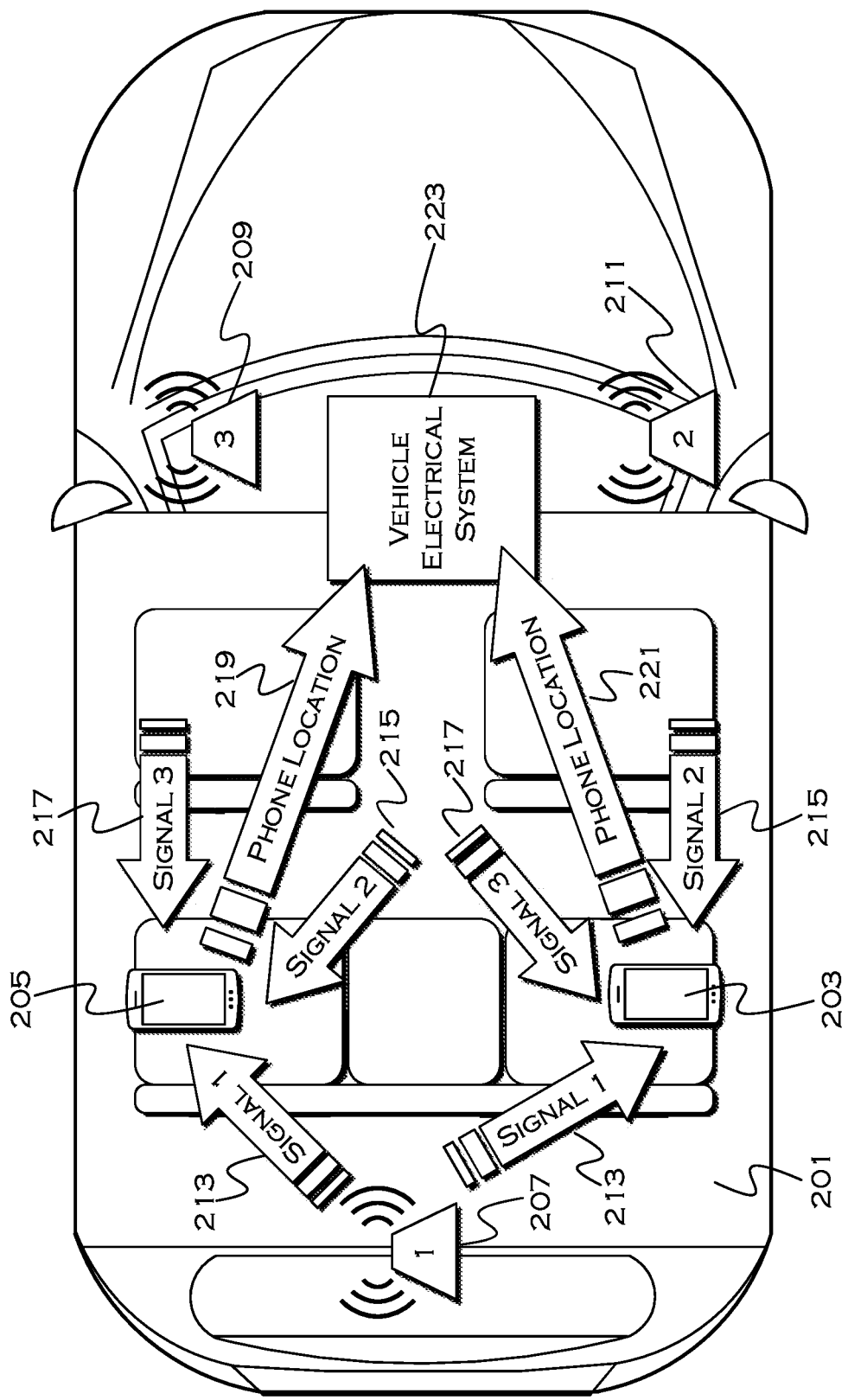
FIG. 2 illustrates a representative detection system interacting with representative rear-seat devices.

FIG. 2 illustrates an illustrative detection system interacting with illustrative rear-seat devices. This is an example of phone-centric architecture, which uses multiple fixed transmitters to send signals for receipt by wireless devices in the vehicle cabin. In a vehicle-centric architecture model, the devices send signals to multiple fixed receivers.

In the illustrative example shown in FIG. 2, the vehicle cabin 201 includes three antennas 207, 209, 211 (with transmission capability) at fixed locations. Each antenna broadcasts a signal 213, 215, 217 for reception by user devices 203, 205 inside the cabin. Received signal strength will vary based on device location, so, for example, the device 203 likely receives a stronger signal 215 from antenna 211 than the signal 217 from antenna 209. The device receives an even stronger signal 213 from antenna 207. Since the signal from 207 is the strongest, the device (or vehicle) knows that the device is located most proximate to antenna 207. This provides for the determination that the device is in a rear seat location. Since the signal from antenna 211 is stronger than the signal from 209, the device (or vehicle) determines that the device is located in a right-rear seat location. If the signals from antenna 211 and 209 are relatively similar, the device might determine that it is located in a center seat position. If the signal from antenna 209 is stronger than the signal from antenna 211, the device might determine that it is in a left-rear seat location.

Antenna location selection can play an important role in the effectiveness of the system. The displayed configuration may result in some difficulty determining the difference between a device in the left pocket of a rear-right sitter and the right pocket of a central-rear sitter. If antennas 209 and 211 were deployed in more rearward positions along exterior vehicle cabin walls, the difference between the two pocket locations might be more marked. Different seating arrangements may benefit from different antenna deployments (and different numbers of antennas). Generally speaking, the deployment should allow for some level of distinction to be made for the close-call scenarios. As will be seen herein, the devices can use additional information to supplement the signal strength determination, which may also assist in differentiation between two device locations that are physically separated by only a matter of inches. Also, although the devices are described in some embodiments as self-determining their own locations, it is also possible for the devices to simply report received signal strength and for the vehicle to utilize this information to determine device locations.

In this example, each device will receive signals from multiple antennas and use this information in applications running on the respective devices to self-determine device location. The devices then report their respective locations to the vehicle electrical system 223, with device 203 reporting location 221 and device 205 reporting location 219. While device locations are not necessarily the corresponding locations of the device possessors (a device can easily be set on an unoccupied seat), reasonable assumptions about a correlation between device and possessor location can be made. In most instances, when a device possessor is not a driver, that person will not place the device at an alternative seating location. This assumption may be even more valid with respect to wearables, which would actually have to be removed to be placed at an alternative location.

A common instance of when a device is located at a different location from a possessor is when the device is charging, but the location-determination algorithm can also take charging into consideration. For example, if a device is charging, the algorithm may wait until charging ends before reporting a location. In another example, a charging device may determine that it is charging in the rear of a vehicle. While the device may not attempt to determine a particular rear seat location if the device is charging, the device can still report that it is in the rear of the vehicle, which likely indicates at least one rear occupant. The vehicle can store the determined position of a device as a location of an occupant, which may or may not explicitly identify the occupant depending on whether a predefined relationship between a person and the mobile device has been established.

Figure 3:
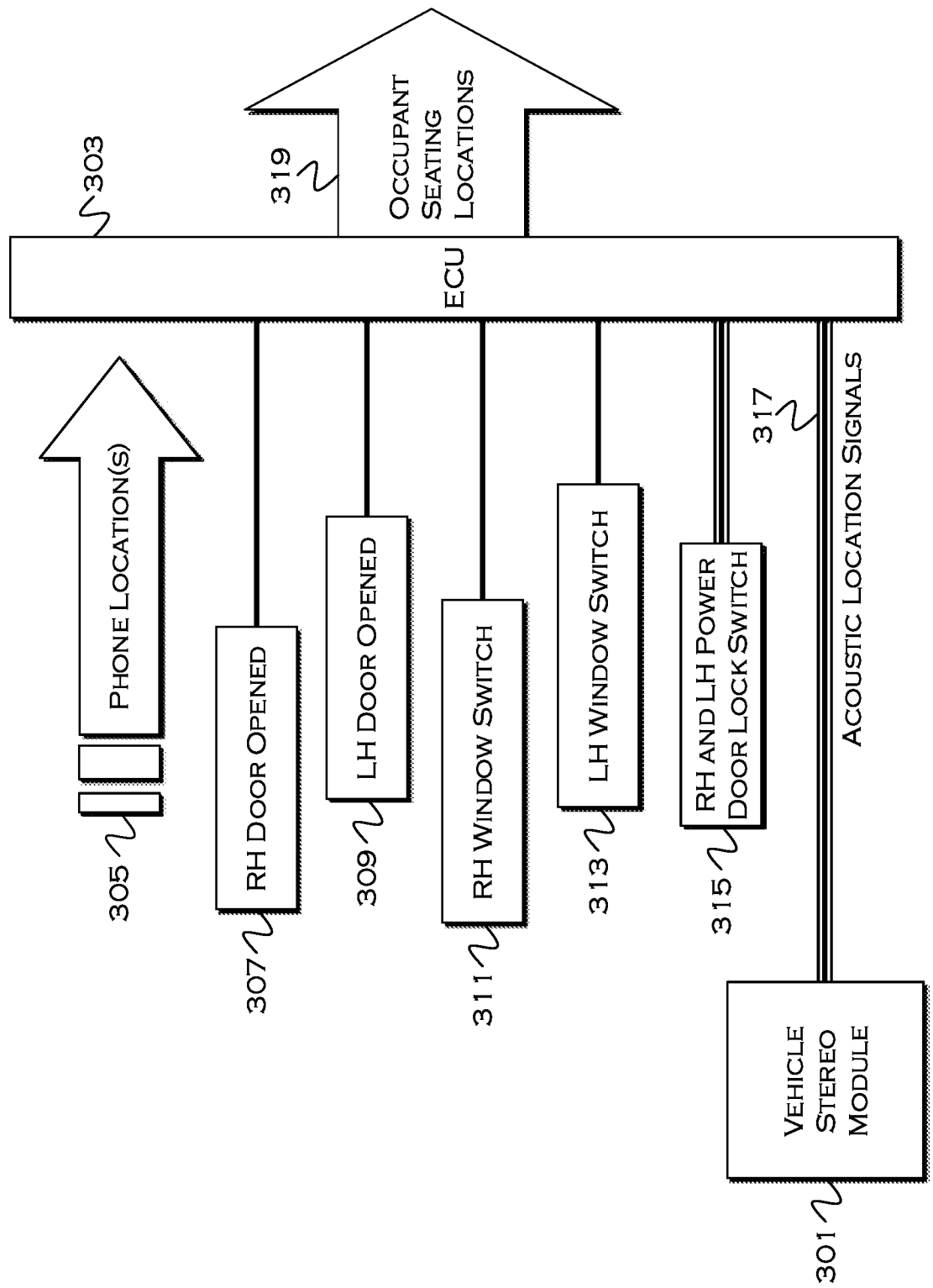
FIG. 3 illustrates an example block diagram of supplemental signal provision systems for occupant location detection.

FIG. 3 illustrates an example block diagram of supplemental signal provision systems for occupant location detection. In order to improve robustness, the system may also include inputs from other pre-existing sources, such as operation of rear doors, rear locks, power windows or other location-related vehicle systems. Occupants commonly utilize the controls most proximate to their location, so there is a reasonable likelihood that the opening of a rear right door indicates an intent to enter and sit in a rear right or center location. Different accommodation can be made for vehicles with multiple rows of rear seating, and the examples provided herein are demonstrative in nature to show how the vehicle or device can use supplemental information to improve the accuracy of occupant location determination.

Some of the signals from vehicle systems may only be known to the vehicle (for example, a phone may not know that a door has been opened or a lock has been actuated) and can be used to verify a reported location. Other verification signals include, for example, sound-based location verification using acoustic signals from the occupants that can be picked up by vehicle deployed microphones.

In the example shown in FIG. 3, a vehicle electronic control unit (ECU) 303 receives signals from the right hand rear door 307, the left hand rear door 309, the right hand rear window switch 311, the left hand rear window switch 313 and the door power locks 315. The ECU also receives audio signals 317 from vehicle microphones included with a vehicle audio system 301.

In this example, the devices within the vehicle report their own locations 305, so the ECU takes the reported location information and performs post-processing verification using the received secondary location indicia (the received signals). This helps finalize the likely seating locations, and can prove useful when a device location might be unclear because of the pocket-location scenario described previously.

A common vehicle module (such as the body controller) may receive all of the various location indicia signals via wireless or wired means. In the example provided, the vehicle ECU receives the phone locations via a wireless signal. The vehicle ECU receives the door opening signals and power window switch activation signals via individual wires. The ECU may receive power door lock switch activation over a data bus, such as CAN or LIN. Acoustic location signals may require processing to determine locations. In this example, a separate module directly connected to the acoustic sensors may perform this processing and communicate the relevant information to the vehicle ECU via a data bus. The ECU combines the signals logically in a software algorithm to determine the most likely seating location based on a combination of the signals. The ECU can also weight sensor signal importance based on the known strengths and weaknesses of a particular signal.

Figure 4:
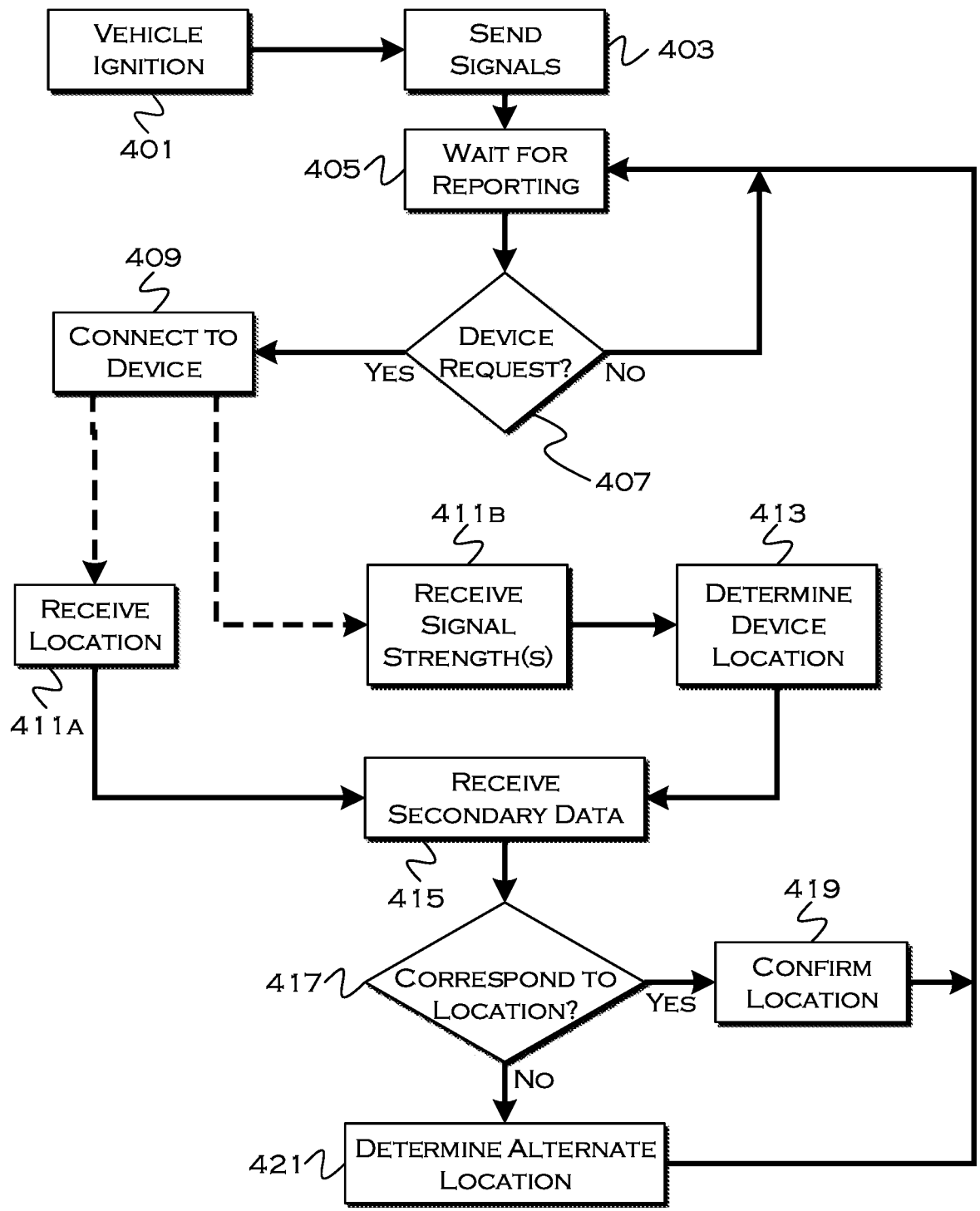
FIG. 4 illustrates a representative process for location determination.

FIG. 4 illustrates an illustrative process for location determination. In this example, the process begins when vehicle ignition takes place 401. While the process could begin at any time, people are less likely to still be moving when ignition occurs. The vehicle could also wait for additional indicia, such as all doors being closed and/or driver seat occupancy. In another example, the process begins when the vehicle begins moving.

At the inception, the vehicle instructs the antenna to send out signals or powers the antenna for signal transmission 403. The vehicle (which may also be performing the location determination, in this example) then waits for signal or location reporting 405. In this illustrative process, the devices receive the signals from the various in-vehicle antennas and report the signal strength of received signals. Applications executing on the devices handle the device processing, and it is not necessary to pair the vehicle with the devices in order for communication to occur. If desired, reporting can be done wirelessly utilizing standards that do not require pairing with the devices (such as the devices logging onto a vehicle Wi-Fi network and reporting the information over the network to a known vehicle module). Once a particular device has received the appropriate signals and requests reporting of the signals 407, the process can communicate with the particular device 409.

In one example, the device self-determines a location and reports the determined location 411a. In another example, the vehicle may determine the location, and the device may report signal strengths 411b. In the latter example, the vehicle uses the reported signal strengths to determine the device location 413.

Also, in this example, the vehicle uses secondary location indicia to verify the determined location 415. This can include the signals discussed herein or similar signals useful to distinguish one seating location from another. The vehicle determines if the secondary indicia correspond to the determined or reported location(s). Since the vehicle receives the device location/signal reporting separate from the secondary indicia, it may be difficult to correlate secondary indicia to a particular device. For example, if more than one device reports a rear-seat location, the determination may be limited to whether any device is reported at a location corresponding to a signal, as opposed to a particular device. On the other hand, if a lack of signals indicates that no devices are likely present at a given specific seat location, or if a particular signal or signals indicate that some device is likely present at a given specific seat location, the signals can still be useful in determining the accuracy of the occupant location determinations.

If the vehicle determines that a location is incorrect 417 based on the secondary indicia, the process may attempt to determine an alternative location 421 for a particular device. For example, if a person entered the vehicle in the left rear door and sat in the middle rear location, but had a phone in their right-hand pocket, the phone may appear to be located at a right rear seat location. Thus, the device or vehicle may initially determine that the device (based on signal strength) is located at the right rear seat. Once the vehicle considers the secondary indicia of the left hand door opening, however, the seating determination may be switched to a middle rear location. This could be further confirmed by the actuation of a left-hand rear window, for example, since it is highly unlikely that a person sitting in the right rear seat will actuate a left-rear window.

Location determination can also be adjusted dynamically as the vehicle travels. Passengers may switch seats, and in cases like the preceding example, the window actuation may not occur until some time into a journey. When a secondary indicator is received, at any point, it can be compared to previously saved seating locations and the vehicle can accommodate for any discrepancies. Either the vehicle can change a determination if the indicia indicates a high likelihood of a wrong location determination, or, in another example, the vehicle could request re-reporting of location/signal strength. The second case might be useful if the indicia didn't serve to clarify a possible location, but instead indicated that at least one rear occupant had likely switched seats entirely. For example, rear right door opening and switch utilization may support initial determination that an occupant is in a rear right seat. In this example, only one rear occupant is detected. At a later point in the journey, a rear left window switch may be used. This could indicate that: a) the person reached across the vehicle to actuate the switch; b) that the person moved to the center of the vehicle; c) that the person moved to the rear left of the vehicle; or d) that someone else entirely activated the switch (either a front seat occupant or another rear occupant whose location was not detected). By resending the signal or requesting updated reporting, the vehicle can quickly determine based on new reported location or signal strength if the previously identified occupant location has changed.

Also, if the occupant location does not appear to have changed based on the updated reporting, the vehicle could determine that a second person may be present in the back seat. While it is not impossible that a front passenger reached back to actuate the window, such an occurrence may be less likely than the likelihood that there is a second person without a device or without a reporting device located in the rear left seat. Thus, while the illustrative embodiments still involve some level of potential false positives or misidentification of seat occupancy, the accuracy of rear seat (and general seat) occupancy determinations can be significantly improved.

Figure 5A:
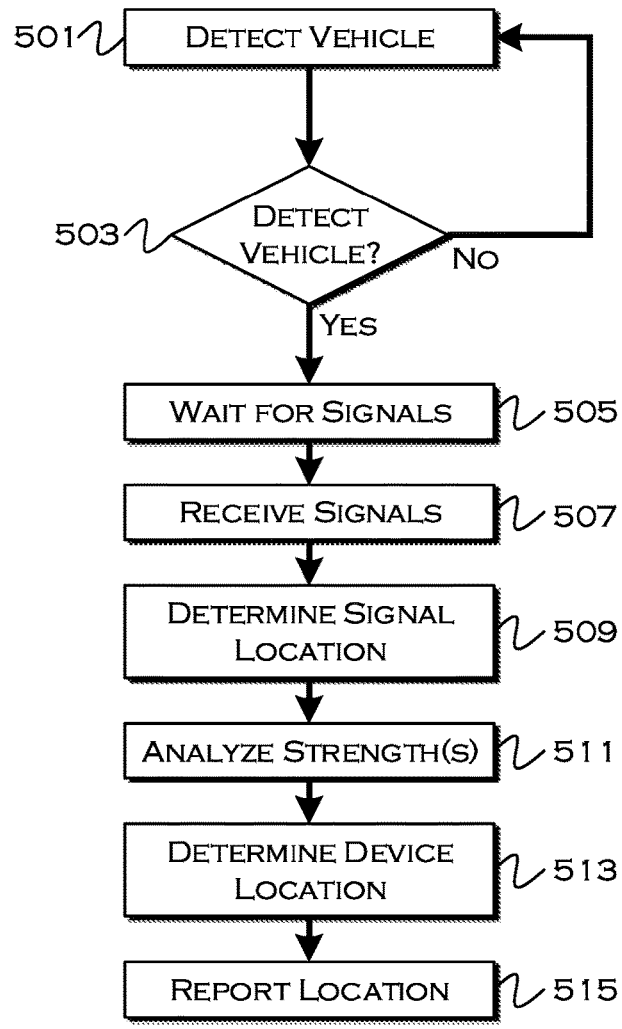
FIGS. 5A and 5B illustrate representative device-based processes for device location self-determination and reporting.
Figure 5B:
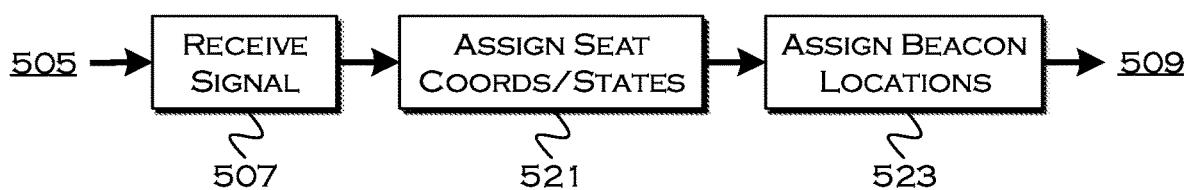

FIGS. 5A and 5B illustrate device-based processes for device location self-determination and reporting. FIG. 5A illustrates a device-based location determining process. This can be enabled through an application/process installed on a device, and the application may also communicate the determined location to the vehicle computer. If the application is configured to simply receive and determine signal strengths from vehicle-deployed transmitters, then the application may report the signal strengths instead.

A user can launch the application, or the application or process may begin when the device detects a vehicle 501. The device can detect the vehicle by detecting a wireless signal transmitted by the vehicle, such as detecting a vehicle Bluetooth signal. In another example, the device may know the vehicle GPS location and may "detect" the vehicle by determining that the device is in a location proximate to the known vehicle GPS location.

In this example the device does not proceed with the location determination until the device determines that it is inside the vehicle 503. The device can make this determination in a variety of manners. Some examples include, but are not limited to—determining that the device is at the same GPS location as the vehicle and that the device GPS location has not changed for a threshold period of time (indicating the user is likely sitting), receiving a signal at a level that is known to represent a signal strength not attenuated by the vehicle body (indicating the device is inside, rather than outside, the vehicle) or receiving other indicia that indicates the device is inside the vehicle.

Once the device is inside the vehicle, the device searches for expected wireless transmission signals 505. It is also possible to skip step and to begin searching for the signals based on a determination that the device detects the vehicle. The particulars may depend on when the vehicle begins signal transmission, for example. If the vehicle consistently transmits out the signals when powered, the device may wait until it is inside the vehicle to determine the device location. On the other hand, if the vehicle does not transmit the signals until the journey is underway, the device may simply wait until the signals are detected, since there is less likelihood of a false positive from a user standing outside the moving vehicle.

Once the device receives the signals 507, the device determines a signal location for each signal. The device can base this determination on a variety of factors, depending on how an OEM has chosen to deploy the transmitting antennas. For example, if the antennas are always at the same fixed locations within all vehicles or all vehicles in a known vehicle model (e.g., always rear-center, front-right, front-left), the device may determine the OEM or model and thus know where the antenna are located. In another example, the signals transmitted from the antenna may self-report antenna location. That is, instead of "empty" signals sent simply for location determination purposes, the antennas may actively transmit data with the signals, including at least an antenna location or relative location within the vehicle.

The example shown with respect to FIGS. 5A and 5B takes the signal+data concept even a step further. It is possible that antenna deployment locations will vary from vehicle to vehicle and model year to model year. If the antenna were installed after-market, the configurations could vary even more. Adding to the complication is the fact that even within certain vehicle models, seating configurations can vary (e.g., a Ford Explorer Sport can have a rear-bench or two rear captain's chairs).

Figure 5C:
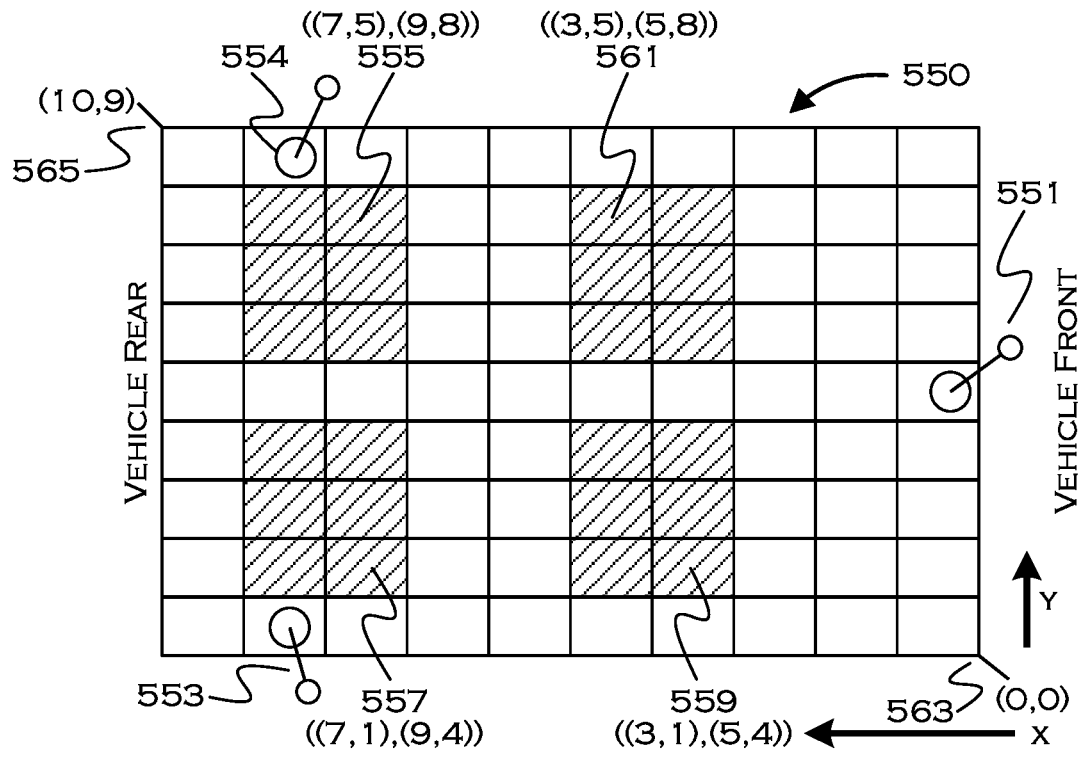
FIGS. 5C and 5D illustrate examples of vehicle grids with varied seating locations and antenna deployment.
Figure 5D:
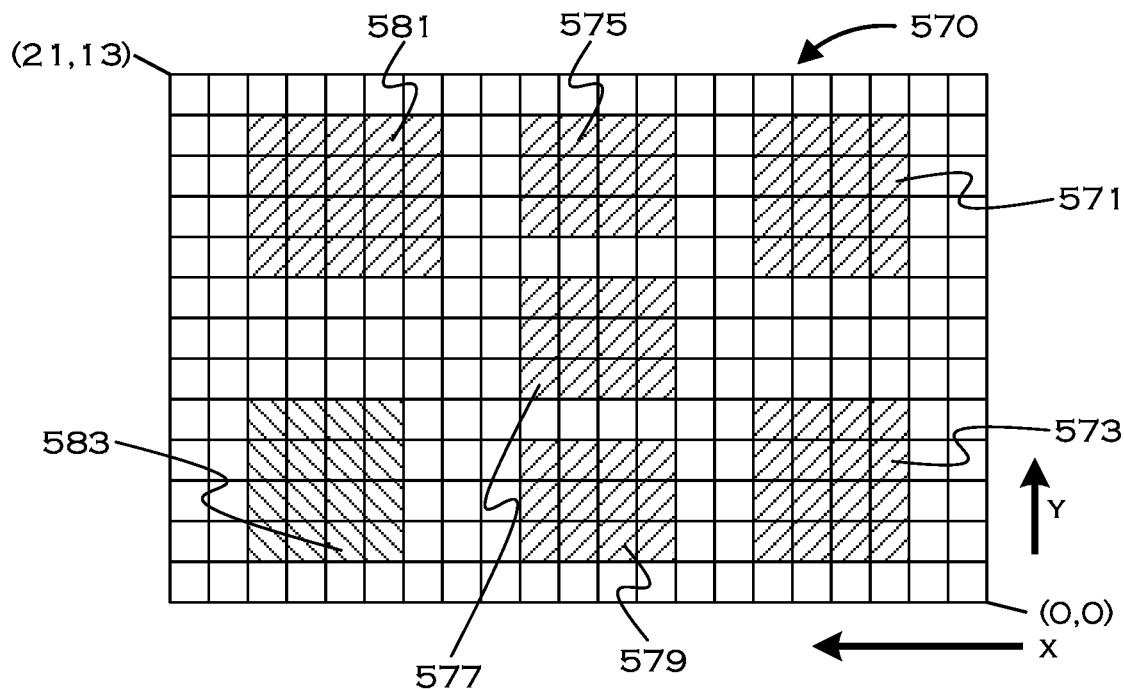

To address this variance, it is possible to consider the vehicle as a small version of a coordinate grid. Certain of the coordinates designate the various seat locations assigned to a particular vehicle configuration. Other coordinates designate antenna locations. Knowing the grid assignments for a particular vehicle allows a device to know both the location (on the grid) and configuration of the actual seats and the relative location of the deployed antennas. Thus, even if the seating configuration changed from vehicle to vehicle and/or antenna location changed, the device could easily accommodate for the changes. In the example shown, the antenna signals include grid data (coordinate values/grid size), seating coordinates within the grid and antenna location within the grid. If the vehicle can dynamically adjust the signal from the antennas, the vehicle could even adjust the seating configuration to account for stowable or removable seats being stowed or removed, respectively (i.e., identify these locations as non-seats). Among other things, accounting for stowable seats and identifying a location of a device as a location of a stowed seat could alert a driver that a passenger was located at a non-seat (and therefore non-seatbelt) location. FIGS. 5C and 5D illustrate examples of vehicle grids with varied seating locations and antenna deployment.

In the example of FIG. 5B, the device receives signals from the antennas which include grid definition, seat locations and antenna locations. The antennas are defined by the closest corresponding grid coordinates to the deployed location, the seats are defined by coordinate pairs denoting opposing corners of the area of the grid occupied by the seat. The device utilizes the defined grid (which can be far more expansive than the grid shown in FIGS. 5C and 5D) and assigns seat coordinates for the identified seats as well as any seat states identified by the signal (stowed seat condition, for example). The beacon/transmitter locations are also assigned on the grid.

Based on the received signal strengths from each of the antennas, which are either in known locations or assigned locations from the grid, the device analyzes the relative signal strengths 511. By knowing the relative signal strengths, the device can determine an approximate relative position with respect to each antenna 513. The device can either use known or approximated decay to determine a distance from each antenna, or the device can use relative strengths to determine relative proximity to each antenna (e.g., the device is closest to antenna 1, and closer to antenna 2 than 3). If the grid is employed, the device can determine a relatively precise or approximate (depending on signal analysis method) location on the grid. The device then chooses the closest corresponding seat as the seat location.

FIGS. 5C and 5D show illustrative vehicle grid coordinate systems. These are examples provided for illustration, a far more detailed grid (many more coordinate points) could be utilized if desired.

In the example shown with respect to FIG. 5C, the grid 550 is a 10×9 grid. The lower right corner (vehicle front right corner) represents the origin 563 in this example at coordinates (0,0). A driver's seat 561 is located covering coordinates (3,5)-(4,7). The corner coordinate pairs can define a square object on the grid, but if higher definition of the seat is desired, a more exact perimeter of coordinates can be defined.

The front passenger seat 559 is defined by (3,1)-(4,3). There are two rear seats, seat 557 defined from (7,1)-(8,3) and seat 554 defined from (7,5)-(8,7). Antennas on this grid are located at 555 (8,8), 553 (8,0) and 551 (0,4). The outermost grid coordinate in this system is 565 (9,8).

FIG. 5D shows an example of a larger grid 570 sized at 21×13 for a reconfigurable vehicle (stowable seats) with a middle bench. As before, the origin is at (0,0) in the front right corner. Two front seats 571 and 573 are defined as well. Antenna location is not shown in this depiction, although suitable deployment to distinguish between possible rear seating positions is contemplated. Locations rearward of the rear most seats 581 and 583, leftwards and rightwards (respectively) of those seats, leftwards and rightwards of the middle seats 575, 579 (respectively) or any other suitable locations are all possible antenna locations. Placing an antenna leftwards of and directly between seats 581 and 575 may not be the best configuration, for example, because a device at the center of each seat could receive approximately the same signal strength. A front-most antenna could be used to differentiate between these locations, but if the front-most signal were blocked to both devices due to interference, the process could have difficulty distinguishing between seating locations on the basis of relative signal strength from the noted antenna and a similarly deployed antenna on the opposite side of the vehicle. Thus, antenna placement should provide for different relative signal strength values detectable at different seat locations.

Seats 575, 577 and 579 define the seating positions on a bench seat. They are not designated as a whole block in this example, even though the bench may be a single seating element. Detections of devices in the blank spaces between the seats may benefit from later refinement by the vehicle based on the previously discussed secondary indicia.

There are also two rear seating locations 581 and 583. Seat 583 is a stowable seat that is stowed in this example. Thus, while the seating location 583 is a candidate location, it corresponds to a stowed seat. Detection of a device at this location indicates that a device (and possibly occupant) is sitting on top of the stowed seat. This could result in the vehicle issuing an alert to a driver.

As can be seen from the examples, different vehicles can have different grids and different seat and antenna locations provided thereto. By notifying the device of the particular grid and antenna placement, the device can easily adjust seat location determinations to accommodate varied seating configurations across different vehicles. This can be done automatically, so that a user does not need to input the particulars of a vehicle configuration. Through use of the illustrative embodiments, device location relative to vehicle antenna can be determined and used as a proxy for occupant location. Secondary seating indicia can supplement this information, and the secondary seating indicia can refine the location determinations, providing an accurate snapshot of occupant location for use by vehicle systems.

While representative embodiments are described above, it is not intended that these embodiments describe all possible forms of the claimed subject matter. The words used in the specification are words of description rather than limitation, and it is understood that various changes may be made without departing from the spirit and scope of the disclosure. Additionally, the features of various implementing embodiments may be combined in logical manners to produce situationally suitable variations of embodiments described herein.

What is claimed is:

1. A non-transitory computer readable storage medium storing instructions that, when executed, cause a mobile device processor to perform a method comprising:
   detecting signals from a plurality of vehicle-deployed antennas at a mobile device processor, the signals further indicating vehicle coordinate grid parameters of a vehicle coordinate grid and locations, within the coordinate grid, of each of the vehicle-deployed antennas;
   determining, at the mobile device processor, respective signal strengths for each detected signal;
   determining a distance from each antenna, based on the signal strength of the signal received from each respective antenna;
   determining a location of the mobile device, at the mobile device processor, within a vehicle cabin, based on the distance from each antenna; and transmitting the device location from a mobile device including the processor to a vehicle computing system.

2. The storage medium of claim 1, further comprising receiving antenna identification included with the signal from each respective antenna, the identification identifying the respective antenna from which a respective signal originated.

3. The storage medium of claim 1, further comprising transmitting a predetermined user identity along with the device location.

4. The storage medium of claim 1, wherein the parameters include locations of seating areas within the coordinate grid.

5. The storage medium of claim 4, wherein the locations of seating areas are defined as coordinate sets corresponding to coordinates within the grid.

6. The storage medium of claim 1, wherein the locations of each of the vehicle-deployed antennas are defined as coordinate set corresponding to a nearest coordinate to a location of a given of the plurality of the vehicle-deployed antennas.

7. The storage medium of claim 1, wherein the determined location of the mobile device is determined and transmitted at least as a coordinate location within the coordinate grid.

* * * * *